(12) United States Patent
Sakai (10) Patent No.: US 6,915,774 B2
(45) Date of Patent: Jul. 12, 2005

(54) INTAKE APPARATUS FOR INTERNAL COMBUSTION ENGINE

(75) Inventor: Taro Sakai, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/815,974

(22) Filed: Apr. 2, 2004

(65) Prior Publication Data

US 2004/0226535 A1 Nov. 18, 2004

(30) Foreign Application Priority Data

Apr. 3, 2003 (JP) ........................................ 2003-100198

(51) Int. Cl.$^7$ .............................................. F02B 31/00
(52) U.S. Cl. ................ 123/184.52; 123/432; 123/193.5
(58) Field of Search ....................... 123/184.21–184.61, 123/302, 305, 308, 193.3, 193.5, 188.14

(56) References Cited

U.S. PATENT DOCUMENTS

| | | | | |
|---|---|---|---|---|
| 4,164,205 A | * | 8/1979 | Asanomi et al. | 123/406.73 |
| 4,256,062 A | * | 3/1981 | Schafer | 123/308 |
| 4,494,493 A | * | 1/1985 | Morikawa et al. | 123/184.52 |
| 4,543,931 A | * | 10/1985 | Hitomi et al. | 123/308 |
| 4,550,699 A | * | 11/1985 | Okumura et al. | 123/308 |
| 5,267,543 A | * | 12/1993 | Novak et al. | 123/306 |
| 5,937,815 A | * | 8/1999 | Hidaka | 123/184.56 |
| 6,450,141 B1 | * | 9/2002 | Sakuma | 123/184.57 |
| 6,499,456 B1 | | 12/2002 | Nogi et al. | |
| 6,581,566 B2 | * | 6/2003 | Oishi | 123/306 |
| 6,615,789 B2 | * | 9/2003 | Inoue et al. | 123/193.6 |

FOREIGN PATENT DOCUMENTS

| | | |
|---|---|---|
| JP | 6-159079 A | 6/1994 |
| JP | 6-159203 A | 6/1994 |
| JP | 2001-193469 A | 7/2001 |
| JP | 2001-248484 A | 9/2001 |
| JP | 2002-54535 A | 2/2002 |

OTHER PUBLICATIONS

U.S. Appl. No. 10/676,077, filed Oct. 2, 2003, Sakai et al.
U.S. Appl. No. 10/676,015, filed Oct. 2, 2003, Arimatsu et al.
U.S. Appl. No. 10/816,001, filed Apr. 2, 2004, Sakai et al.
U.S. Appl. No. 10/815,972, filed Apr. 2, 2004, Nishii et al.
U.S. Appl. No. 10/815,969, filed Apr. 2, 2004, Tominaga et al.

\* cited by examiner

*Primary Examiner*—Marguerite McMahon
(74) *Attorney, Agent, or Firm*—Foley & Lardner LLP (57) ABSTRACT

An intake apparatus for an internal combustion engine, including a partition dividing an intake port into a first passage and a second passage, and a gas motion control valve including a rotatable valve element disposed upstream of the partition and spaced from an upstream end thereof. The gas motion control valve has a full-closed position where the valve element prevents intake air from flowing into the second passage and a full-open position where the valve element allows the intake air to flow into the second passage. The valve element is inclined so as to guide a flow of the intake air to the first passage when the gas motion control valve is in the full-closed position. The valve element and the partition cooperate with each other to define an interspace therebetween when the gas motion control valve is in the full-closed position.

11 Claims, 7 Drawing Sheets

INTAKE APPARATUS FOR INTERNAL COMBUSTION ENGINE

BACKGROUND OF THE INVENTION

The present invention relates to intake apparatus for an internal combustion engine, and more specifically to an intake apparatus including an intake port for increasing incylinder gas motion such as tumble or swirl.

Gas motion in engine cylinder such as tumble or swirl is important to achieve stable combustion of diluted air/fuel mixture in a spark ignition internal combustion engine. Accordingly, engines of some types require an intake apparatus which can increase incylinder gas motion in wider engine operation region.

Japanese Patent Application First Publication No. 2002-54535 shows a gas motion control valve to increase incylinder gas flow by closing a half of the section of an intake port. Japanese Patent Application First Publication No. H06-159079 shows an intake apparatus including a partition dividing an intake port into upper and lower halves, and a gas motion control valve closing the lower half of the intake port, to increase a tumble ratio.

SUMMARY OF THE INVENTION

Such a gas motion control valve is arranged to produce an incylinder tumbling flow by decreasing an open area to an entire flow passage area of an intake port. However, as the open area ratio becomes smaller, the flow resistance increases, and the quantity of intake air that a cylinder can take in becomes smaller. Therefore, an engine operating region in which an incylinder flow is increased by a gas motion control valve is limited to a relatively narrow range.

It is an object of the present invention to provide an intake apparatus for increasing incylinder gas motion without decreasing the open area ratio of an intake port excessively.

In one aspect of the present invention, there is provided an intake apparatus for an internal combustion engine, the internal combustion engine including a plurality of engine cylinders and an intake port connected to each of the engine cylinders, the intake apparatus comprising:

a partition extending in a longitudinal direction of the intake port so as to divide an inside region of the intake port into a first passage and a second passage; and a gas motion control valve including a rotatable valve element disposed upstream of the partition and spaced from an upstream end of the partition, the gas motion control valve having a full-closed position where the valve element prevents intake air from flowing into the second passage of the intake port and a full-open position where the valve element allows the intake air to flow into the second passage of the intake port, the valve element being inclined so as to guide a flow of the intake air to the first passage of the intake port when the gas motion control valve is in the full-closed position, the valve element and the partition cooperating with each other to define an interspace between the valve element and the upstream end of the partition when the gas motion control valve is in the full-closed position.

In a further aspect of the present invention, there is provided an intake apparatus for an internal combustion engine, the internal combustion engine including a plurality of engine cylinders and an intake port connected to each of the engine cylinders, the intake apparatus comprising:

split means for dividing an inside region of the intake port into a first passage and a second passage which extend in a longitudinal direction of the intake port; and valve means for controlling intake air flowing into the second passage of the intake port, the valve means guiding a flow of the intake air to the first passage of the intake port when the valve means prevents the intake air from flowing into the second passage of the intake port, the valve means cooperating with the split means to recirculate a part of intake air flowing toward the engine cylinder through the first passage of the intake port, to an upstream end of the first passage of the intake port through the second passage of the intake port when the valve means prevents the intake air from flowing into the second passage of the intake port.

DETAILED DESCRIPTION OF THE INVENTION

Figure 1:
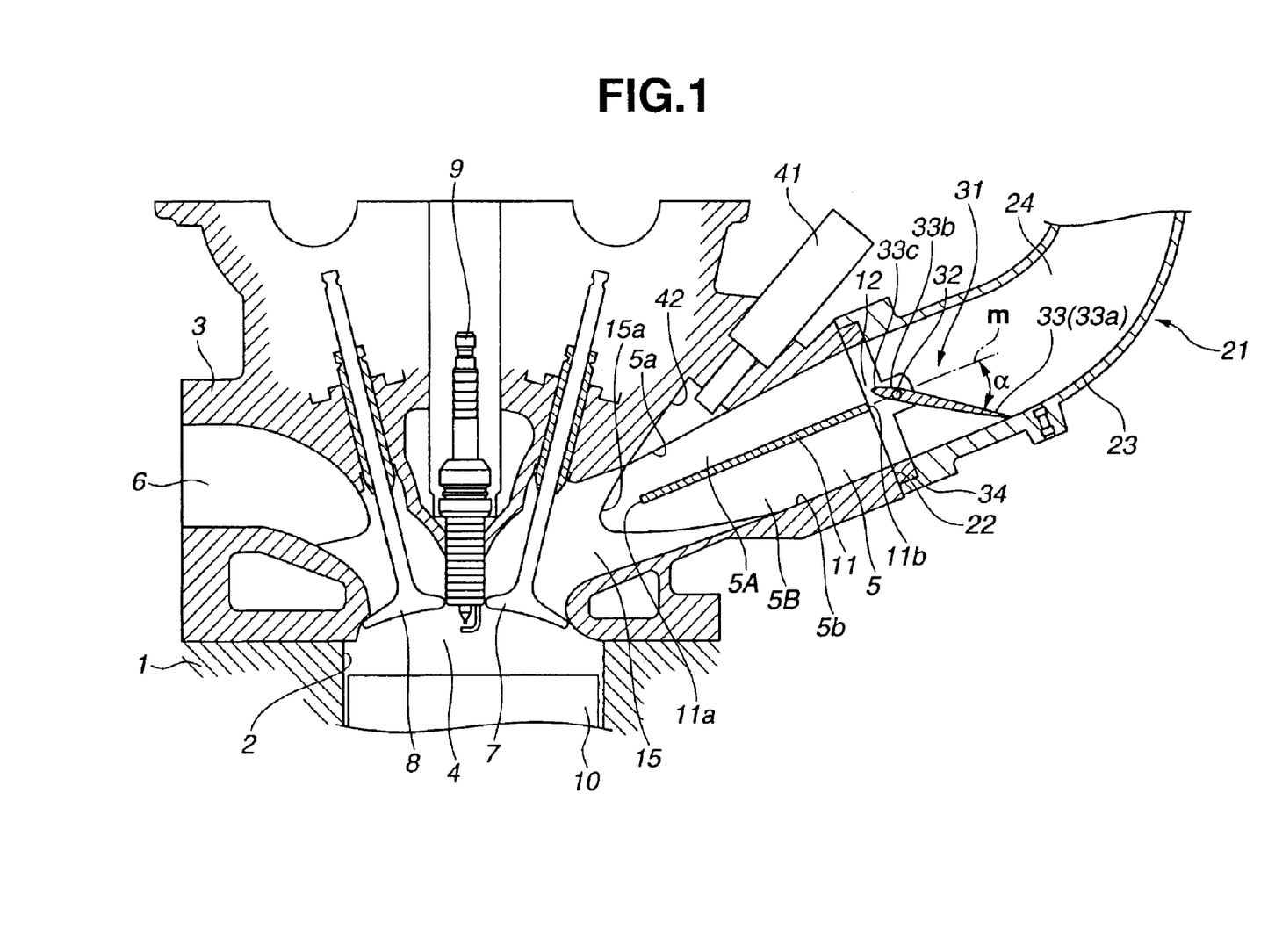
FIG. 1 is a sectional view showing an engine with an intake apparatus according to an embodiment of the present invention.
Figure 2:
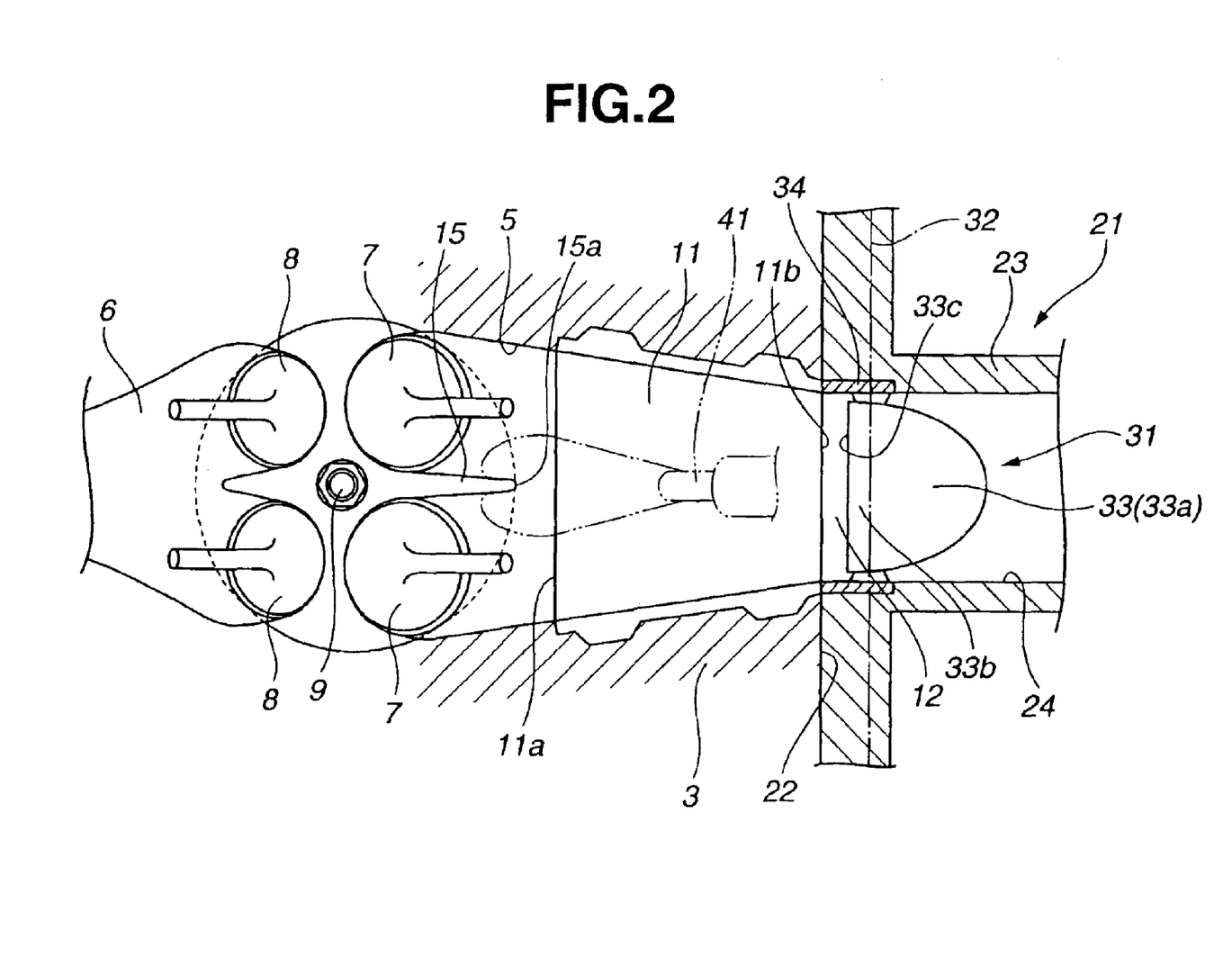
FIG. 2 is a plan view of the intake apparatus of FIG. 1 as viewed from above.

Referring to FIGS. 1 and 2, an intake apparatus according to an embodiment of the present invention now is explained. In this embodiment, the intake apparatus is applied to a port-injection spark ignition internal combustion engine and designed to strengthen an incylinder gas motion, specifically, tumble. Of course, this apparatus may be applied to other types of engine, such as a direct-injection spark ignition internal combustion engine. As illustrated in FIG. 1, the engine has an engine block including cylinder block 1 and cylinder head 3 covering a top portion of cylinder block 1. Cylinder block 1 is formed with a plurality of engine cylinders 2. Cylinder head 3 is formed with a plurality of recesses each defining pentroof-shaped combustion chamber 4 that has two sloping surfaces. Intake port 5 is connected to each of engine cylinders 2, and has a downstream end open in one of the two sloping surfaces of combustion chamber 4. Exhaust port 6 has an end open in the other of the two sloping surfaces of combustion chamber 4. In this embodiment, intake port 5 includes an air passage formed in cylinder head 3 and a downstream end portion of branch passage 24 of branch portion 23 of intake manifold 21. Alternatively, intake port 5 may be formed only in cylinder head 3. Intake valve 7 is arranged to open and close the downstream end of intake port 5. Exhaust valve 8 is arranged to open and close the end of exhaust port 6. In this embodiment, a downstream end portion of intake port 5 is bifurcated, and has two branches each opening into combustion chamber 4. Accordingly, each engine cylinder 2 has two intake valves 7 for opening and closing the downstream ends of the two branches of intake port 5. Similarly, each engine cylinder 2 has two exhaust valves 8. Spark plug 9 is provided at a central portion of combustion chamber 4 which is surrounded by these four valves 7 and 8. Piston 10 is received in engine cylinder 2. Piston 10 has a flat crown as shown in FIG. 1. However, the piston crown may be designed to have various shapes according to various requirements, such as requirement for stratified charge combustion.

Intake port 5 has an elongated inside region therein. Partition 11 extends in a longitudinal direction of intake port 5 so as to divide the elongated inside region of intake port 5 into an upper region and a lower region as shown in FIG. 1. The upper region acts as first passage 5A, and the lower region acts as second passage 5B. The term "upper" means "higher" in position in an axial direction of engine cylinder 2 which extends from the position of an engine crankshaft toward combustion chamber 4. In this embodiment, cylinder head 3 is made of aluminum alloy, and partition 11 is in the form of a metal plate, for instance, a steel plate, as an insert inserted into cylinder head 3 upon casting cylinder head 3, to thereby be formed as an integral part of cast cylinder head 3.

Downstream end 11a of partition 11 is located on a most-downstream side, namely, near intake valve 7. Specifically, downstream end 11a of partition 11 is located immediately upstream of branch point 15a of the two branches of intake port 5. Namely, downstream end 11a of partition 11 is positioned immediately upstream of an upstream end of intermediate wall 15 that is disposed between the two branches of intake port 5 and separates the downstream end portion of intake port 5 into the two branches. In this embodiment, a portion of intake port 5 receiving partition 11 extends substantially straight in the longitudinal direction of intake port 5, and partition 11 extends along the portion of intake port 5. Namely, partition 11 is in the form of a flat plate extending substantially straight in the longitudinal direction of intake port 5. However, intake port 5 may be curved, and partition 11 may be curved along the curved section of intake port 5. Upstream end 11b of partition 11 is flush with intake manifold mount surface 22 of cylinder head 3 onto which intake manifold 21 is mounted. Upstream end 11b of partition 11 can be positioned slightly downstream of intake manifold mount surface 22 of cylinder head 3 in order to prevent partition 11 from being contacted with tools upon machining intake manifold mount surface 22. As illustrated in FIG. 2, upstream end 11b and downstream end 11a of partition 11 are parallel to intake manifold mount surface 22 of cylinder head 3. The metal plate forming partition 11 has a generally trapezoidal shape in plan view. However, this shape depends on a geometry of intake port 5.

Thus, partition 11 splits the inside region of intake port 5 excluding the two branches and interspace 12 between partition 11 and valve element 33 as explained later, into first upper passage 5A defined by partition 11 and upper inside wall surface 5a of intake port 5, and second lower passage 5B defined by partition 11 and lower inside wall surface 5b thereof.

Intake port 5 is connected with branch portion 23 of intake manifold 21 which is provided corresponding to each engine cylinder 2. First and second passages 5A and 5B of intake port 5 are communicated with branch passage 24 of branch portion 23. Thus, there is provided an intake path extending from a collector portion, not shown, of intake manifold 21 to each engine cylinder 2. Branch passage 24 has a downstream portion located near intake port 5 which extends straight in the longitudinal direction of intake port 5, and an upstream portion upstream of the downstream portion which is upwardly curved toward the collector portion.

Gas motion control valve 31 is arranged to control a flow of intake air flowing into second passage 5B of intake port 5. Gas motion control valve 31 has a full-closed position where the intake air flowing from the upstream side of gas motion control valve 31 is prevented from flowing into second passage 5B of intake port 5, and a full-open position where the intake air flowing from the upstream side of gas motion control valve 31 is allowed to flow into second passage 5B of intake port 5. Specifically, gas motion control valve 31 is disposed in the downstream portion of branch passage 24 of branch portion 23 of intake manifold 21 and adjacent to upstream end 11b of partition 11. Gas motion control valve 31 includes rotatable valve shaft 32 and plate-shaped valve element 33 fixedly supported on valve shaft 32. Valve shaft 32 extends in a direction of a row of the engine cylinders and is rotatable about its axis. Valve shaft 32 is located on the downstream portion of branch passage 24 of branch portion 23 and positioned on imaginary reference plane m extending straight from partition 11 toward the upstream side of partition 11 as shown in FIG. 1. The axis of valve shaft 32 lies in reference plane m. Valve element 33 includes main portion 33a extending from valve shaft 32 in one direction, and extension portion 33b extending from valve shaft 32 in an opposite direction and having a length smaller than a length of main portion 33a. Main portion 33a opens and closes the upstream end of second passage 5B of intake port 5. Main portion 33a has a profile substantially matched with a lower inside wall surface of the downstream portion of branch passage 24. In this embodiment, main portion 33a has a generally semi-elliptic profile as illustrated in FIG. 2. In contrast, as shown in FIG. 2, extension portion 33b is formed into an elongated rectangular shape having a distal end, namely, downstream end 33c of valve element 33, which extends straight and parallel to intake manifold mount surface 22 and upstream end 11b of partition 11. Valve shaft 32 is spaced from upstream end 11b of partition 11 such that extension portion 33b of valve element 33 is prevented from interfering with upstream end 11b of partition 11. In this embodiment, downstream end 33c of valve element 33 is positioned slightly upstream of intake manifold mount surface 22 of cylinder head 3. Namely, downstream end 33c of valve element 33 is located slightly upstream of an end surface of a downstream end flange of branch portion 23 which abuts on intake manifold mount surface 22 of cylinder head 3.

Valve shaft 32 is connected with an actuator, not shown. Gas motion control valve 31 is controlled to be in the full-closed position shown in FIG. 1 in an engine operating situation to strengthen tumble. In the full-closed position, valve element 33 fully closes the upstream end of second passage 5B of intake port 5. Valve element 33 is placed in an inclined state in which main portion 33a is located upstream of valve shaft 32 and the intake air flowing from the upstream side of gas motion control valve 31 is guided to first passage 5A of intake port 5 along an upper surface of valve element 33. In other words, main portion 33a of valve element 33 is designed in profile to completely close a lower region positioned lower than valve shaft 32 when valve element 33 is in the inclined state. In the full-closed position, inclination α of valve element 33 is smaller than 90 degrees, and preferably, in a range of 30–40 degrees. Here, inclination α is defined as an angle formed by valve element 33 and reference plane m extending straight from partition 11 toward the upstream side. Further, in the full-closed position of gas motion control valve 31, extension portion 33b of valve element 33 projects toward the upper region above partition wall 11, namely, first passage 5A, in intake port 5. Further, valve element 33 and partition 11 cooperate with each other to define interspace 12 between downstream end 33c of valve element 33 and upstream end 11b of partition 11. Interspace 12 acts as a communication passage through which the upstream end of first passage 5A and the upstream end of second passage 5B are communicated with each other. In this embodiment, as illustrated in FIG. 2, upstream end 11b of partition 11 and downstream end 33c of valve element 33 have straight peripheral edges parallel to each other, between which interspace 12 having a uniform length is produced.

In an engine operating region such as a high speed high load region where the intake air quantity becomes greater, gas motion control valve 31 is in the full-open position where valve element 33 fully opens the upstream end of second passage 5B of intake port 5. In the full-open position of gas motion control valve 31, valve element 33 is aligned in plane with partition 11 and parallel to the intake air stream oriented toward intake port 5. Extension portion 33b of valve element 33 is aligned in plane with partition 11 to thereby minimize interspace 12. Downstream end 33c located on extension portion 33b is positioned adjacent to upstream end 11b of partition 11.

In this embodiment, gas motion control valve 31 includes valve frame 34 having an annular shape. Valve element 33 is rotatably supported inside valve frame 34. Valve element 33 and valve frame 34 constitute one unit. Valve element 33 is arranged within the downstream portion of branch passage 24 of branch portion 23 by mounting the one unit to an inner periphery of the downstream end flange of branch portion 23 of intake manifold 21. Branch portion 23 has a recessed portion in the inner periphery of the downstream end flange, to which valve frame 34 with valve element 33 is fitted. Valve shaft 32 is inserted into valve element 33 such as to cross respective branch portions 23, and is connected with respective valve elements 33. Intake manifold 21 having thus-constructed gas motion control valve 31 is mounted to cylinder head 3 so that gas motion control valve 31 is fixedly held in place.

Fuel injector 41 for injecting fuel toward intake port 5 is arranged upward of intake port 5 of cylinder head 3. Fuel injector 41 is designed to provide a generally V-shaped split spray of fuel corresponding to the pair of intake valves 7. As illustrated in FIG. 1, fuel injector 41 is located near intake valve 7 in order to prevent the fuel spray oriented toward valve heads of intake valves 7 from interfering with partition 11. Recessed portion 42 is formed in upper inside wall surface 5a of intake port 5. The fuel sprayed from fuel injector 41 passes through recessed portion 42 and the downstream end portion of intake port 5, and is directed toward the valve heads of intake valves 7.

The internal combustion engine has a known exhaust gas recirculation apparatus, not shown, for instance, an exhaust gas recirculation control valve, for recirculating a part of exhaust gas emitted from an exhaust system to an intake system. The exhaust gas recirculation apparatus is constructed to realize stable combustion at high exhaust gas recirculation rate by utilizing tumble in engine cylinder 2 and therefore improve fuel economy in a part load engine operating region. The exhaust gas recirculated may be introduced to the collector portion of intake manifold 21 or may be distributed to branch passage 24 for each engine cylinder 2.

Figure 3:
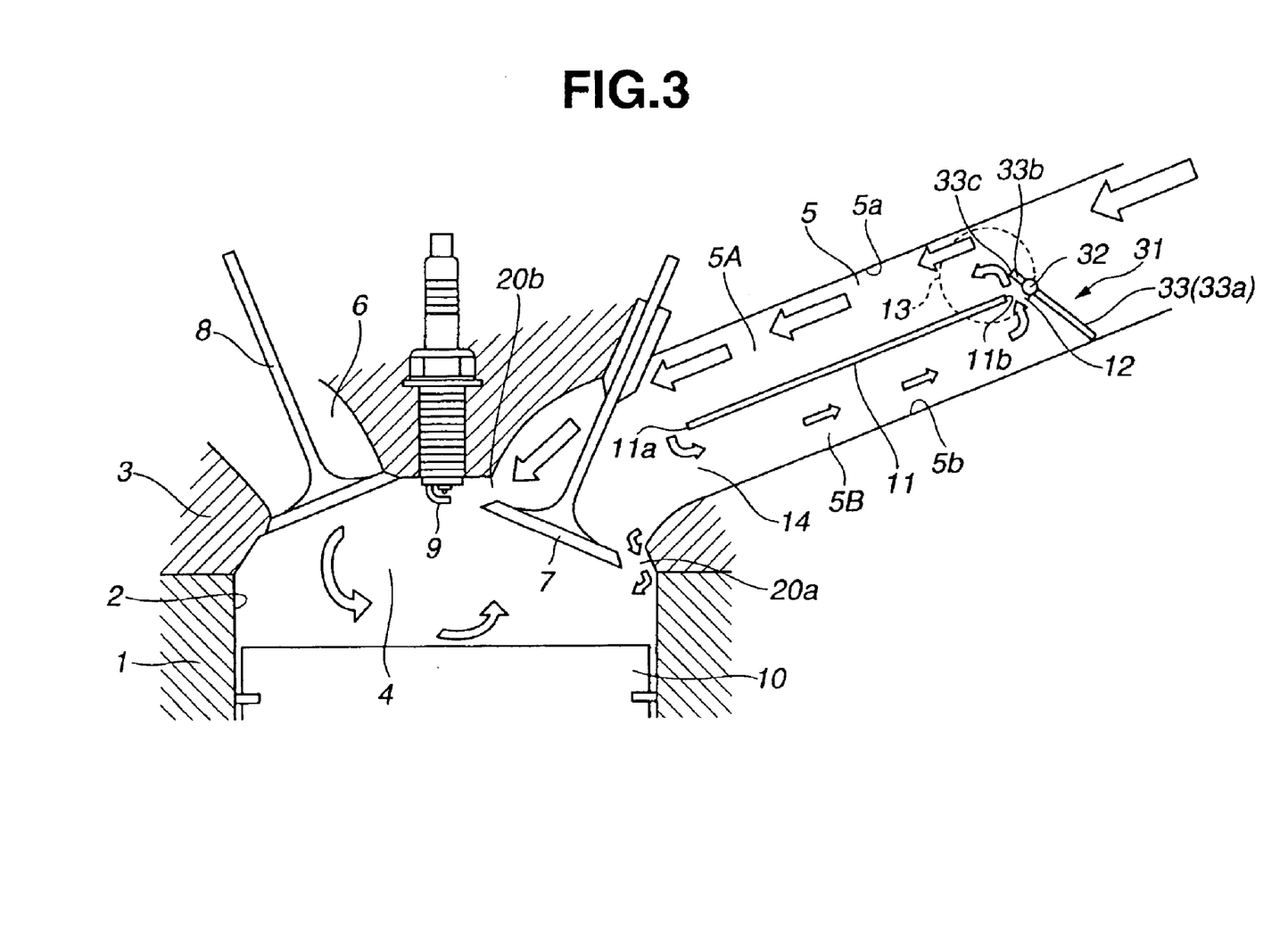
FIG. 3 is an explanatory diagram schematically illustrating a construction of the intake apparatus of FIG. 1.

Referring to FIG. 3, an operation of the intake apparatus of the embodiment is explained. On intake stroke, intake valve 7 is opened and piston 10 descends in the downward direction in engine cylinder 2. Intake air flows into engine cylinder 2 through an open aperture around intake valve 7. In this condition, when gas motion control valve 31 is in the full-open position where both of first passage 5A and second passage 5B are opened, the intake air flows toward engine cylinder 2 through first passage 5A and second passage 5B. The intake air then substantially uniformly flows into engine cylinder 2 through the open aperture around intake valve 7. As a result, the gas motion produced in engine cylinder 2 is relatively weak.

On the other hand, when gas motion control valve 31 is in the closed position shown in FIG. 3, where second passage 5B is closed by gas motion control valve 31, the intake air flows toward engine cylinder 2 only through first passage 5A. As illustrated in FIG. 3, the intake air stream flowing along upper inside wall surface 5a of intake port 5 is large, while the intake air stream flowing along lower inside wall surface 5b of intake port 5 is remarkably small. Consequently, the intake flow rate is small and the intake flow velocity is low in lower portion 20a of the open aperture formed between intake valve 7 and the outer circumference of engine cylinder 2. In upper portion 20b of the open aperture formed between intake valve 7 and spark plug 9, the intake flow rate is great and the intake flow velocity is high. As a result, in engine cylinder 2, there is formed a strong tumbling fluid motion as shown by arrows in FIG. 3, so-called forward tumble, flowing from the intake side of intake valves 7 to the exhaust side of exhaust valves 8, and toward the crown of piston 10. Further, when gas motion control valve 31 is in the closed position, the intake air stream is throttled to flow only through first passage 5A. This causes local pressure reduction in the vicinity of upstream end 11b of partition 11 to thereby produce low pressure region 13 as shown in FIG. 3. Interspace 12 acting as the communication passage between first passage 5A and second passage 5B is located in low pressure region 13. There is formed a pressure difference between interspace 12 and downstream end 14 of second passage 5B. Because of the pressure difference, downstream end 14 of second passage 5B serves as a suction inlet through which a part of the intake air in first passage 5A is sucked into second passage 5B. The part of the intake air then flows through second passage 5B toward the upstream side of intake port 5, and enters from interspace 12 into first passage 5A and then merged into the intake air in first passage 5A. In other words, a part of the intake air passing through first passage 5A and flowing to the downstream side of intake port 5 is recirculated through second passage 5B and interspace 12, to first passage 5A. For this reason, the intake air stream flowing through upper portion 20b of the open aperture around intake valve 7 becomes larger, while the intake air stream flowing through lower portion 20a of the open aperture becomes smaller. This produces more strengthened tumble in engine cylinder 2. The intake air stream passing through lower portion 20a of the open aperture acts on the tumbling fluid motion in engine cylinder 2 so as to suppress the tumbling fluid motion. However, in this embodiment, the intake air stream passing through upper portion 20b of the open aperture can be increased, and at the same, the intake air stream passing through lower portion 20a of the open aperture can be reduced. This serves for effectively producing a strong tumble in engine cylinder 2.

The strong tumble produced in engine cylinder 2 is significantly useful for improving fuel economy by recirculating a large quantity of exhaust gas. In a part load engine operating region, the strong tumble can be produced by closing gas motion control valve 31 to thereby attain a stable combustion. In addition, a large quantity of exhaust gas can be recirculated to thereby increase the exhaust gas recirculation rate. This can attain a stable combustion, and therefore, can improve fuel economy.

Specifically, in the closed position shown in FIG. 3, extension portion 33b of valve element 33 of gas motion control valve 31 projects toward first passage 5A located upper than partition 11. Thus projecting extension portion 33b helps to effectively produce lower pressure region 13, so that the intake recirculation is ensured through interspace 12 between valve element 33 and partition 11.

When gas motion control valve 31 is in the full-open position in high speed high load engine operating region, valve element 33 is aligned in plane with partition 11. Owing to the alignment, flow resistance of the intake air streams flowing through first passage 5A and second passage 5B can be reduced. Further, in the full-open position, extension portion 33b of valve element 33 is located within interspace 12 between valve element 33 and partition 11 to thereby reduce interspace 12 and restrain disturbance in the intake air streams. Further, in this embodiment shown in FIG. 1, main portion 33a and extension portion 33b of valve element 33 gradually decrease in thickness toward tip ends thereof, each having a tapered section. Accordingly, the intake air streams can smoothly flow, and therefore, the flow resistance can be further reduced.

Figure 4:
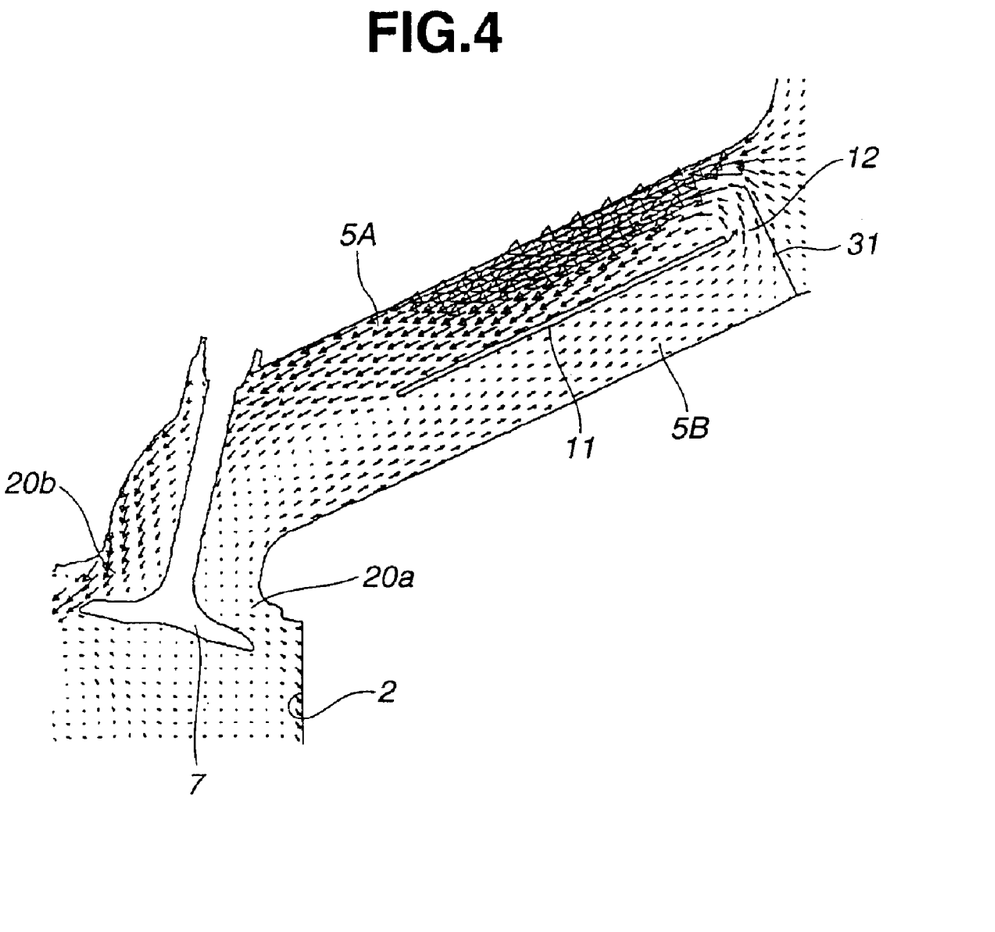
FIG. 4 is an explanatory diagram illustrating intake air streams in an intake port in the intake apparatus of FIG. 1.
Figure 5:
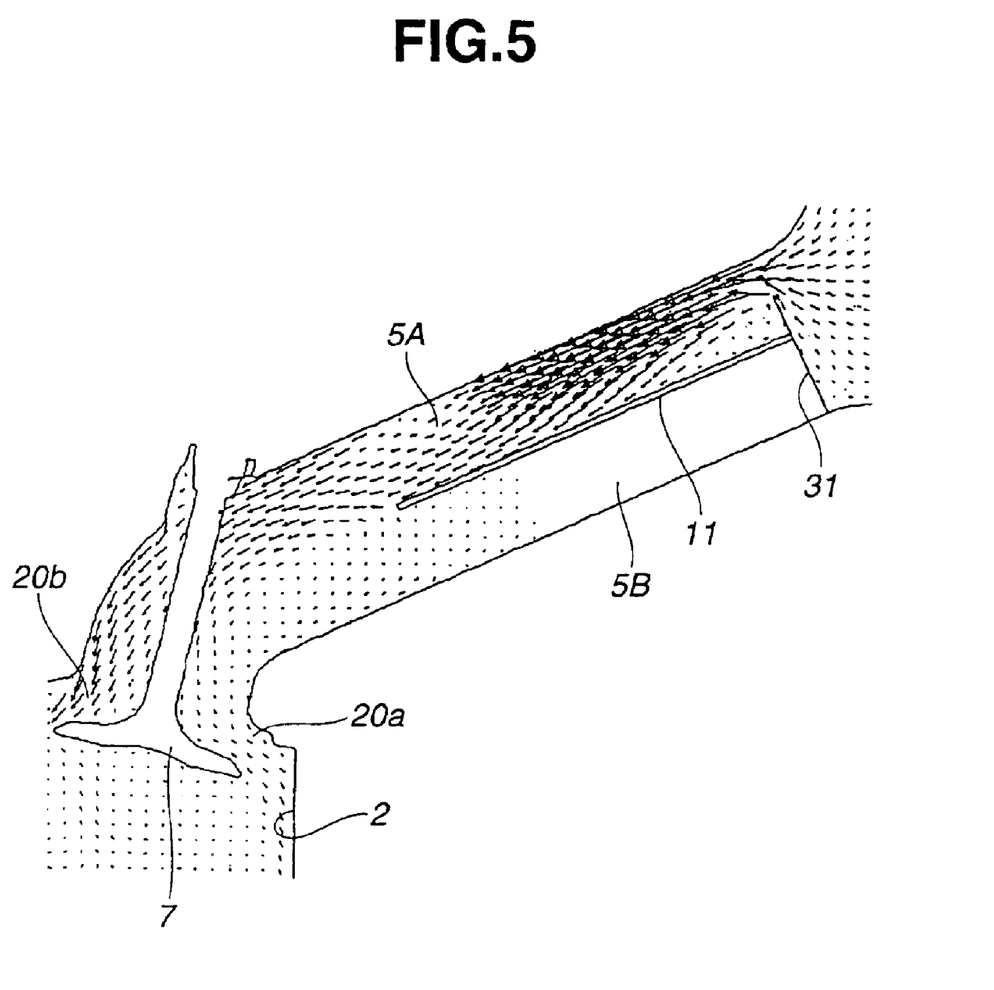
FIG. 5 is an explanatory diagram similar to FIG. 4, but showing intake air streams in an intake port in an intake apparatus of a comparative example.

FIG. 4 shows the results of analysis of actual intake air flow in the intake apparatus of the embodiment. In FIG. 4, the speed and direction of fluid flow in each of points are shown as a vector by a small arrow. The density of arrows indicates the flow rate. The flow rate is high in a region in which arrows are dense, and low in a region in which arrows are coarse. FIG. 5 shows intake air flow in a comparative example in which interspace 12 acting as the communication passage between first and second passages 5A and 5B is eliminated. The arrangement of FIG. 5 corresponds to an intake apparatus of earlier technology in which the intake air flow is deflected to one side merely by partition 11 and gas motion control valve 31. In both cases of FIGS. 4 and 5, the opening degree of gas motion control valve 31 is held at the same value (about 20%).

The followings are evident from comparison between FIGS. 4 and 5. In the example of FIG. 5, a considerable amount of intake air passing though first passage 5A diffuses downward on the downstream side of downstream end 11a of partition 11, and flows into engine cylinder 2 through lower portion 20a of the open aperture around intake valve 7. In second passage 5B below partition 11, the intake air is almost motionless and stagnant. In contrast, in the case of FIG. 4, intake air is recirculated from a lower region near intake valve 7 to first passage 5A through second passage 5B. Therefore, the intake air flow passing through lower portion 20a of the open aperture around intake valve 7 is significantly reduced, and the intake air flow passing through upper portion 20a of the open aperture around intake valve 7 is increased. Thus, the arrangement of FIG. 4 can effectively enhance the incylinder tumble.

Figure 6:
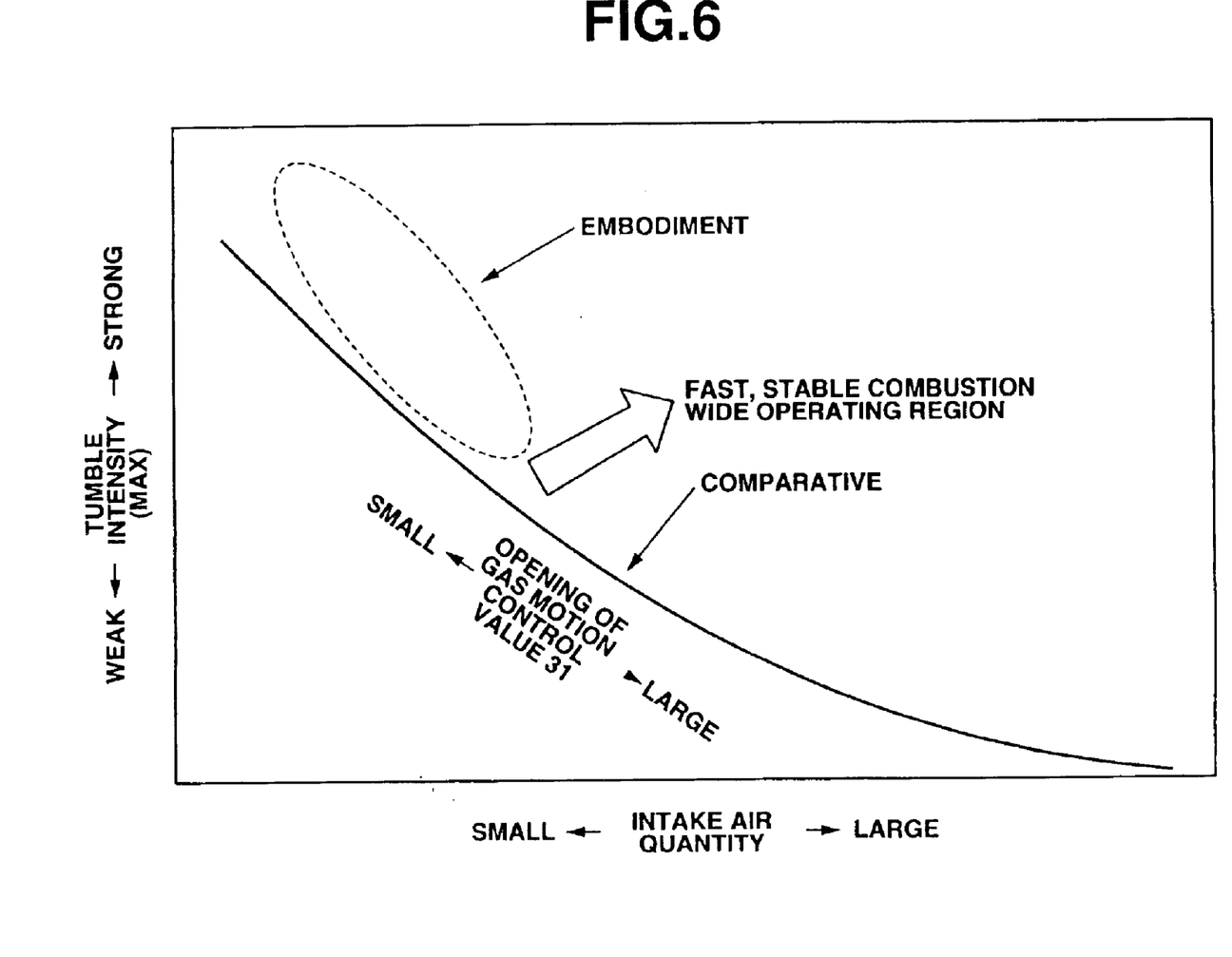
FIG. 6 is a graph showing a relationship between tumble intensity and intake air quantity, to illustrate effect of the embodiment.

FIG. 6 shows a relationship between the tumble intensity and the intake air quantity in an intake apparatus employing partition 11 and gas motion control valve 31 as in the cases of FIGS. 4 and 5. In FIG. 6, the tumble intensity is expressed as a maximum value of the tumble ratio during intake stroke. In general, the combustion tends to be slow and unstable when the tumble is weak, and the combustion tends to be fast and stable when the tumble is strong. A characteristic of the comparative example of FIG. 5 is shown by a solid line curve in FIG. 6. In the case of this characteristic, the tumble and the intake air quantity are related to each other in the following manner. As the open area ratio or opening degree of gas motion control valve 31 is set to a smaller value, the tumble becomes strong but the intake air quantity becomes smaller. On the other hand, as the open area ratio or opening degree of gas motion control valve 31 is set to a larger value, the intake air quantity is increased but the tumble becomes weak. A decrease of the intake air quantity means a reduction in the area of a tumble operating region in which tumble can be produced, that is, an operating region in which gas motion control valve 31 can be in the closed position. Inversely, an increase of the intake air quantity means an increase in the area of the tumble operating region. A characteristic of the embodiment of FIG. 4 is shown in an area circled by a broken line in FIG. 6. In this case, the tumble and the intake air quantity are related to each other in the following manner. When the tumble intensity is held constant, the intake air quantity can be increased. When the intake air quantity (the open area ratio or opening degree) is held constant, the tumble intensity can be increased.

Accordingly, the combination of large exhaust gas quantity recirculation and strong tumbling can be achieved in a wide engine operating region, serving for significantly enhancing fuel economy in the engine as a whole. Further, as compared with the intake apparatus of the comparative example, a stronger tumble can be produced in this embodiment in the same engine operating region. This can perform recirculation of a larger quantity of exhaust gas, so that the fuel economy can be further improved.

As described above, in this embodiment, the incylinder fluid motion can be effectively improved by recirculating a part of intake air from upper fluid passage 5A of intake port 5 to lower fluid passage 5B closed by gas motion control valve 31. Further, in this embodiment, a strengthened incylinder fluid motion can be provided without excessively decreasing the open area ratio of intake port 5. Accordingly, increase in pumping loss which is caused due to increase in flow resistance in intake port 5 can be suppressed. Further, the intake air quantity flowing into engine cylinder 2 can be increased, so that the incylinder fluid motion can be enhanced in a wide engine operating region.

Further, in this embodiment, partition 11 is formed from a metal plate as an insert inserted into cylinder head 3 upon casting to thereby form an integral part of cast cylinder head 3. Gas motion control valve 31 is arranged within the downstream portion of branch portion 23 of intake manifold 21. With this arrangement of partition 11 and gas motion control valve 31, the intake apparatus can be structurally simplified, and deterioration of the assembling operation can be avoided. Specifically, since gas motion control valve 31 and valve frame 34 constitute one unit, the operation of mounting the unit to the downstream end portion of branch portion 23 can be performed with increased efficiency. Further, the respective positions of upstream end 11b of partition 11 and downstream end 33c of valve element 33 of gas motion control valve 31 can be checked and adjusted before mounting intake manifold 21 to cylinder head 3. Accordingly, the accuracy in dimension of interspace 12 between upstream end 11b of partition 11 and downstream end 33c of valve element 33 can be readily attained. This serves for avoiding fluctuation of the tumble intensity which is caused due to change in dimension of interspace 12. Further, intake manifold mount surface 22 and upstream end 11b of partition 11 can be subjected to machining to be flush with each other, after casting cylinder head 3 with a metal plate used as partition 11. In such a case, upstream end 11b of partition 11 can be held in place with increased accuracy.

Figure 7:
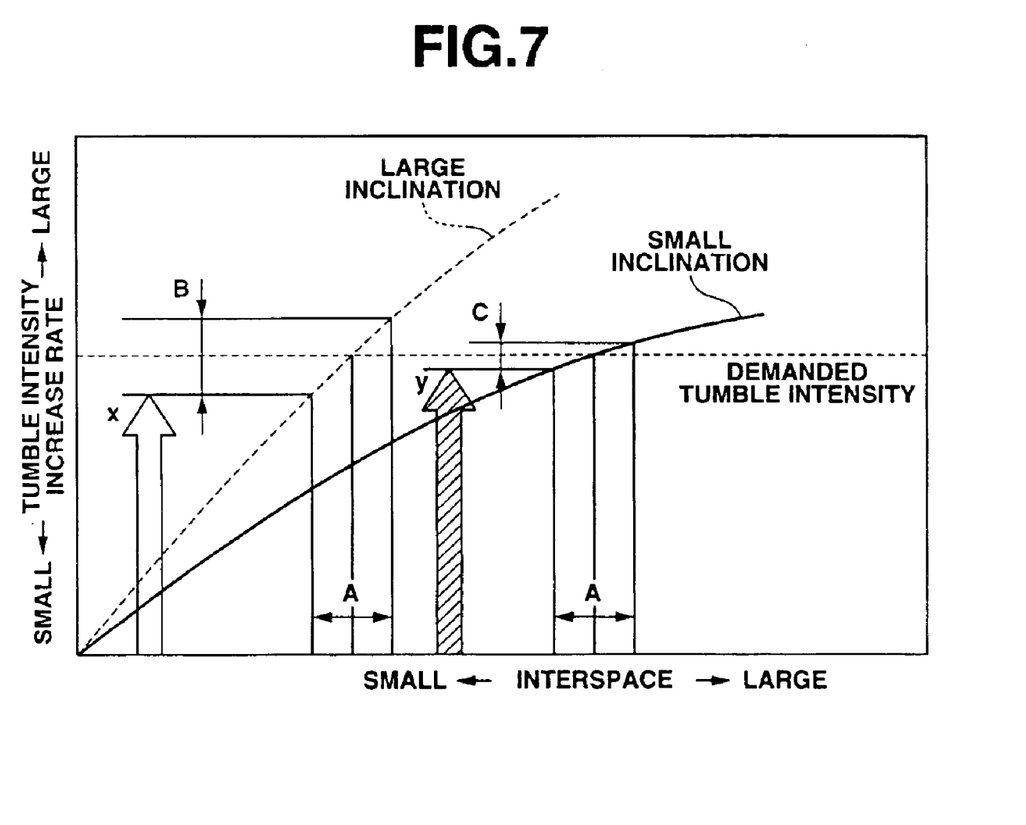
FIG. 7 is a graph showing a relationship between tumble intensity and interspace between a valve element and a partition in the embodiment in a case where an inclination of the valve element is large, and a relationship therebetween in a case where the inclination of the valve element is small.

Further, in this embodiment, inclination α as shown in FIG. 1, of valve element 33 made when gas motion control valve 31 is in the full-closed position is relatively small. This serves for reducing a range where the tumble intensity produced in engine cylinder 2 is fluctuated due to dimensional error of interspace 12 formed between valve element 33 and partition 11 when gas motion control valve 31 is in the full-closed position. FIG. 7 shows a relationship between an increase rate of the tumble intensity and size of interspace 12, with respect to change in inclination α of valve element 33. As illustrated in FIG. 7, in a certain range of inclination α of valve element 33, as interspace 12 is increased, the tumble intensity tends to increase. In a case where inclination α of valve element 33 is relatively large, specifically, near 90 degrees, the increase rate of the tumble intensity relative to increase in size of interspace 12 rises steeply as indicated by a broken line curve in FIG. 7. In contrast, when inclination α of valve element 33 is below 90 degrees and relatively small, the increase rate of the tumble intensity relative to increase in size of interspace 12 rises slowly as indicated by a solid line curve in FIG. 7. If a demanded tumble intensity is set as indicated by a broken straight line in FIG. 7 and if error in actual size of interspace 12 occurs in constant range A, the tumble intensity will be fluctuated over range B in the case of the relatively large inclination α of valve element 33. On the other hand, in the same condition, in the case of the relatively small inclination α of valve element 33 as indicated by the solid line curve in FIG. 7, the tumble intensity will be fluctuated in range C. As is apparent from FIG. 7, the tumble intensity fluctuation occurring in the case of the relatively small inclination α of valve element 33 is smaller than the tumble intensity fluctuation occurring in the case of the relatively large inclination α thereof. Accordingly, this embodiment using the relatively small inclination α of valve element 33 serves for suppressing fluctuation of combustion between engine cylinders of a multiple cylinder engine and ensuring stable combustion in each of the engine cylinders.

Further, in FIG. 7, reference character x indicates a minimum tumble intensity attainable in the case of the relatively large inclination α of valve element 33 in which the fluctuation in tumble intensity over constant error range A lies in range B. Reference character y indicates a minimum tumble intensity attainable in the case of the relatively small inclination α of valve element 33 in which the fluctuation in tumble intensity over constant error range A lies in range C. As seen from FIG. 7, minimum tumble intensity y is greater than minimum tumble intensity x. As described above, the combination of large exhaust gas quantity recirculation and strong tumble in engine cylinder 2 serves for enhancing fuel economy. Upon enhancing the fuel economy by increasing the exhaust gas recirculation rate, a limit of the exhaust gas recirculation rate is determined depending on tumble intensity. If the tumble intensity corresponding to the limit of the exhaust gas recirculation rate is not attained, unstable combustion will be caused. Therefore, the limit of the exhaust gas recirculation rate is actually determined based on the minimum tumble intensity attainable by considering the fluctuation in tumble intensity. Accordingly, upon attaining a demanded tumble intensity, the limit of the exhaust gas recirculation rate can be determined high by setting inclination α of valve element 33 to the relatively small value as described above. This serves for further improving fuel economy. Further, upon enhancing fuel economy by making an air-fuel ratio lean, a limit of the air-fuel ratio is determined depending on tumble intensity. More lean-side combustion can be achieved by setting the relatively small inclination α of valve element 33 as described above. Meanwhile, error range A will occur due to, for instance, error in assembling cylinder head 3 and intake manifold 21, variation in dimension of parts such as gas motion control valve 31, and variation in actual inclination α of valve element 33 in the closed position.

However, if inclination α of valve element 33 is extremely small, the necessary length of main portion 33a of valve element 33 will become too large. This causes problems as to rigidity of gas motion control valve 31 against a rotational force generated about valve shaft 32, state or condition of valve element 33 in the closed position of gas motion control valve 31, flow resistance occurring in the closed position thereof, vibration of valve element 33 in the closed position thereof, and the like. A lower limit of inclination α of valve element 33 is determined by considering these problems. As a result, it is preferred to set inclination α of valve element 33 in the range of 30–40 degrees.

In the embodiment described above, a range of permissible dimensional error of interspace 12 can be improved by setting the relatively small inclination α below 90 degrees, preferably in the range of 30–40 degrees, of valve element 33. Since suitable interspace 12 is provided by assembling cylinder head 3 with partition 11, and intake manifold 21 with gas motion control valve 31, sufficiently large tumble intensity can be produced in each of engine cylinders 2 with high accuracy.

In the embodiments described above, intake port 5 is divided by partition 11 into upper and lower passages, namely, first and second passages 5A and 5B, to thereby increase an incylinder tumbling fluid flow (vertical swirl). However, partition 11 can be oriented in various ways to strengthen an incylinder swirling fluid flow (horizontal swirl) or to strengthen an incylinder fluid motion intermediate between the tumble and swirl.

This application is based on prior Japanese Patent Application No. 2003-100198 filed on Apr. 3, 2003. The entire contents of the Japanese Patent Application No. 2003-100198 are hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. An intake apparatus for an internal combustion engine, the internal combustion engine including a plurality of engine cylinders and an intake port connected to each of the engine cylinders, the intake apparatus comprising:

a partition extending in a longitudinal direction of the intake port so as to divide an inside region of the intake port into a first passage and a second passage; and a gas motion control valve including a rotatable valve element disposed upstream of the partition and spaced from an upstream end of the partition, the gas motion control valve having a full-closed position where the valve element prevents intake air from flowing into the second passage of the intake port and a full-open position where the valve element allows the intake air to flow into the second passage of the intake port, the valve element being inclined so as to guide a flow of the intake air to the first passage of the intake port when the gas motion control valve is in the full-closed position, the valve element and the partition cooperating with each other to define an interspace between the valve element and the upstream end of the partition when the gas motion control valve is in the full-closed position.

2. The intake apparatus as claimed in claim 1, wherein the gas motion control valve comprises a rotatable valve shaft on which the valve element is fixedly supported, the valve element comprising a main portion extending from the valve shaft toward an upstream side of the valve shaft, the main portion preventing the intake air from flowing into the second passage of the intake port when the gas motion control valve is in the full-closed position.

3. The intake apparatus as claimed in claim 1, wherein the valve shaft is located on a plane extending from the partition, the valve element being aligned in plane with the partition when the gas motion control valve is in the full-open position.

4. The intake apparatus as claimed in claim 1, wherein the valve element has an inclination smaller than 90 degrees when the gas motion control valve is in the full-closed position, the inclination being defined by the valve element and a reference plane extending from the partition toward an upstream side of the partition.

5. The intake apparatus as claimed in claim 4, wherein the inclination is in a range of 30–40 degrees.

6. The intake apparatus as claimed in claim 1, wherein the internal combustion engine comprises a cylinder head defining the engine cylinders and an intake manifold mounted to the cylinder head, the partition being provided in the cylinder head, the gas motion control valve being provided in the intake manifold.

7. The intake apparatus as claimed in claim 1, wherein the valve element partially projects toward the first passage of the intake port when the gas motion control valve is in the full-closed position.

8. The intake apparatus as claimed in claim 1, wherein the second passage of the intake port is a lower region of the intake port that is located below the partition in an up-and-down direction of the engine cylinder, the first passage of the intake port being an upper region of the intake port that is located above the partition in the up-and-down direction of the engine cylinder.

9. An intake apparatus for an internal combustion engine, the internal combustion engine including a plurality of engine cylinders and an intake port connected to each of the engine cylinders, the intake apparatus comprising:

split means for dividing an inside region of the intake port into a first passage and a second passage which extend in a longitudinal direction of the intake port; and valve means for controlling intake air flowing into the second passage of the intake port, the valve means guiding a flow of the intake air to the first passage of the intake port when the valve means prevents the intake air from flowing into the second passage of the intake port, the valve means cooperating with the split means to recirculate a part of intake air flowing toward the engine cylinder through the first passage of the intake port, to an upstream end of the first passage of the intake port through the second passage of the intake port when the valve means prevents the intake air from flowing into the second passage of the intake port.

10. The intake apparatus as claimed in claim 8, wherein the valve means defines an inclination smaller than 90 degrees with respect to a reference plane extending from the split means toward an upstream side of the split means when the valve means prevents the intake air from flowing into the second passage of the intake port.

11. The intake apparatus as claimed in claim 10, wherein the inclination is in a range of 30–40 degrees.

* * * * *